US008615547B2

(12) United States Patent  (10) Patent No.: US 8,615,547 B2
Englund et al.  (45) Date of Patent: Dec. 24, 2013

(54) CONVERSION OF WEBCAST TO ONLINE COURSE AND VICE VERSA

(75) Inventors: Shawn Englund, Seattle, WA (US); Jeffrey M. Steenbergen, Seattle, WA (US); Derrick A. Boden, Seattle, WA (US); Venkata R. Madira, Bellevue, WA (US)

(73) Assignee: Thomson Reuters (Tax & Accounting) Services, Inc., Carrollton, TX (US)

( * ) Notice: Subject to any disclaimer, the term of this patent is extended or adjusted under 35 U.S.C. 154(b) by 1581 days.

(21) Appl. No.: 11/452,758

(22) Filed: Jun. 14, 2006

(65) Prior Publication Data

US 2007/0294424 A1  Dec. 20, 2007

(51) Int. Cl.
 *G06F 15/16* (2006.01)

(52) U.S. Cl.
 USPC .......................................... 709/203; 709/231

(58) Field of Classification Search
 USPC .......... 709/231, 232, 204, 201–203; 715/730, 715/731
 See application file for complete search history.

(56) References Cited

U.S. PATENT DOCUMENTS

| | | | |
|---|---|---|---|
| 6,342,904 B1* | 1/2002 | Vasudevan et al. | 715/723 |
| 6,578,040 B1* | 6/2003 | Syeda-Mahmood | 707/102 |
| 6,646,655 B1* | 11/2003 | Brandt et al. | 715/723 |
| 6,760,916 B2* | 7/2004 | Holtz et al. | 725/34 |
| 7,325,199 B1* | 1/2008 | Reid | 715/723 |
| 7,641,475 B2* | 1/2010 | Katsuyama et al. | 434/322 |
| 7,689,898 B2* | 3/2010 | Merril et al. | 715/201 |
| 8,108,936 B2* | 1/2012 | Kawaguchi et al. | 726/27 |
| 2002/0087592 A1* | 7/2002 | Ghani | 707/500 |
| 2002/0120939 A1* | 8/2002 | Wall et al. | 725/87 |
| 2002/0182570 A1* | 12/2002 | Croteau et al. | 434/107 |
| 2003/0152904 A1* | 8/2003 | Doty, Jr. | 434/350 |
| 2004/0125877 A1* | 7/2004 | Chang et al. | 375/240.28 |
| 2004/0153508 A1* | 8/2004 | Alcorn et al. | 709/205 |
| 2004/0201610 A1* | 10/2004 | Rosen et al. | 345/731 |

* cited by examiner

*Primary Examiner* — Thai Nguyen (74) *Attorney, Agent, or Firm* — Lee & Hayes, PLLC (57) ABSTRACT

Methods, apparatuses, and articles for receiving by a computing device, a stream of audiovisual content, the audiovisual content including at least one quiz, poll, and/or question, are described herein. In various embodiments, the computing device may also determine one or more events in the audiovisual content and determine a set of audiovisual units from the audiovisual content, the set of audiovisual units corresponding at least in part to the determined one or more events. Further, in some embodiments, the computing device may remove from the determined set of audiovisual units one or more audiovisual units that correspond to at least a portion of the at least one quiz, poll, and/or question. In alternate embodiments, the process may be reversed.

21 Claims, 5 Drawing Sheets

CONVERSION OF WEBCAST TO ONLINE COURSE AND VICE VERSA

FIELD OF THE INVENTION

The present invention relates to the field of data processing, in particular, to methods and apparatuses for converting a stream of audiovisual content, such as a web cast, into an online course and vice versa.

BACKGROUND OF THE INVENTION

Advances in networking, processor speed, and video controllers have made possible the streaming of live or previously recorded content, including videos and/or audio recordings of lectures and courses, to the computers of remote users. This streaming and other like kinds of audiovisual content delivery is often referred to as a "web cast." The educational and professional uses of web casts abound. Web casts may be used by industry experts to share their knowledge, by educational institutions to broaden their course offerings, and by persons seeking to fulfill professional education requirements. By allowing remote users to watch, listen to, and even participate in web casts, the number of persons that can be reached by a given lecture or course is greatly enhanced (often at a reduced cost).

Online courses also provide remote users with facilities to meet educational needs and professional education requirements. Such courses, however, often require an intensive amount of time and energy to construct, and may not be as readily available as web casts. Further, online courses often do not attract participation by the same experts that web casts do, because of the greater amount of time and energy required to create an online course.

Web casts, however, can only provide interactivity with remote users if the web casts are live, unlike online courses, which are almost always interactive.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF EMBODIMENTS OF THE INVENTION

Illustrative embodiments of the present invention include, but are not limited to, methods and apparatuses for receiving by a computing device, a stream of audiovisual content, the audiovisual content including at least one quiz, poll, and/or question. In various embodiments, the computing device may also determine one or more events in the audiovisual content and determine a set of audiovisual units from the audiovisual content, the set of audiovisual units corresponding at least in part to the determined one or more events. Further, in some embodiments, the computing device may remove from the determined set of audiovisual units one or more audiovisual units that correspond to at least a portion of the at least one quiz, poll, and/or question.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
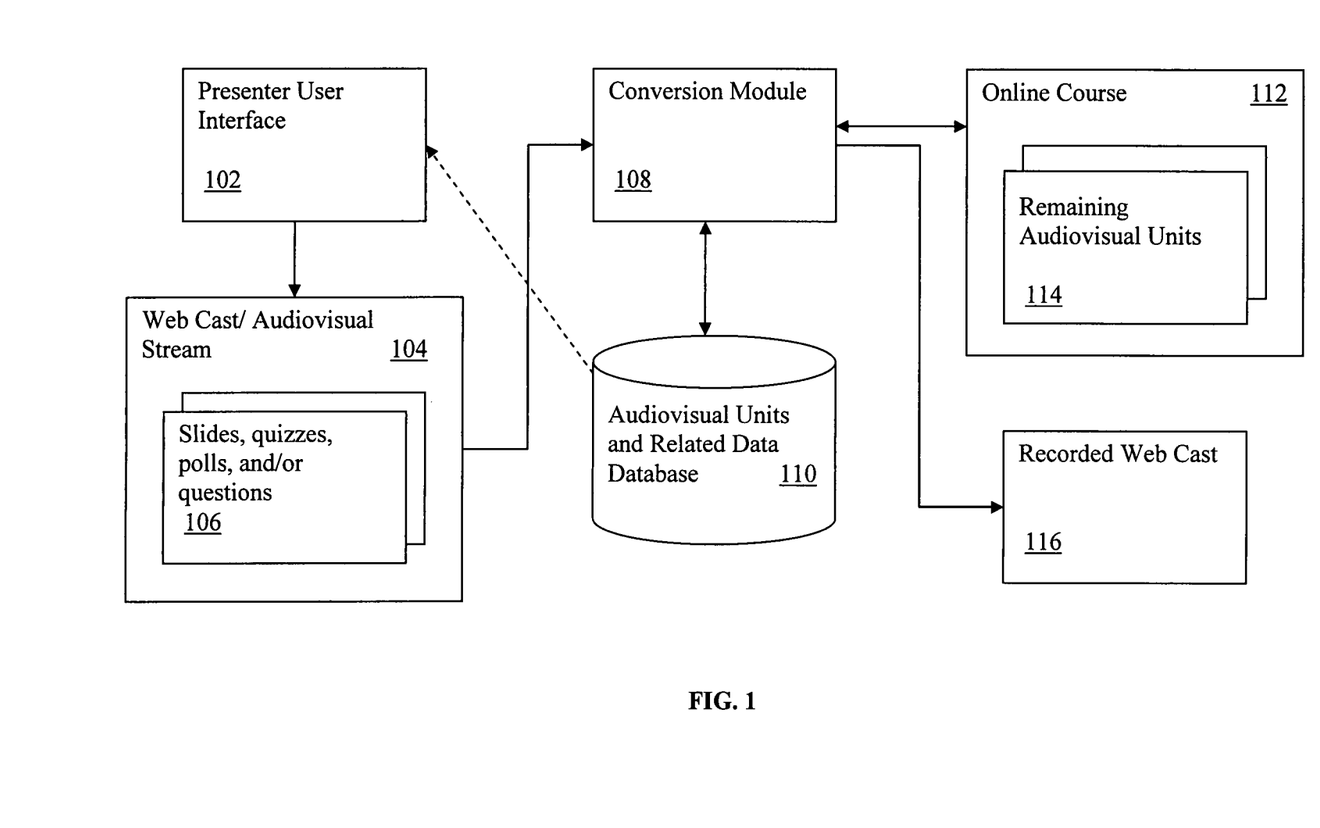
FIG. 1 illustrates an overview of various embodiments of the present invention.

FIG. 1 illustrates an overview of various embodiments of the present invention. As illustrated, a computing device capable of converting web cast/audiovisual stream 104 to online course 112 and/or an online course 112 to a recorded web cast 116 may comprise a presenter user interface 102 capable of facilitating a presenter to create a web cast 104 comprised of one or more slides, quizzes, polls, and/or questions 106. The computing device may further include a conversion module 108 coupled to the presenter user interface 102, which may determine one or more events of the web cast 104, may further determine a set of audiovisual units based on the events, and may store the determined units in an audiovisual unit and related data database 110. The conversion module 108 may then remove at least parts of certain ones of the audiovisual units that correspond to what may be considered dead air or irrelevant content of one or more quizzes, polls, and/or questions, and may input the remaining units 114 to an online course 112. What constitutes dead air or irrelevant content may be application dependent. A generic shell of online course 112 may be provided by another process (not shown) of the computing device, which may also be coupled to the conversion module 108. The conversion module 108 may further receive/retrieve an online course 112 comprised of audiovisual units 114 and related data, the related data including at least one textual representation of a quiz, poll, and/or question, may determine a time period for the quiz, poll, or question, may sequence the units 114 and the related data to create a stream of audiovisual content, and may render the audiovisual content as recorded web cast 116.

In various embodiments, presenter interface 102 and conversion module 108 may be separate processes of a computing device. In other embodiments, they may be sub-processes of one or more processes of the computing device. In yet other embodiments, processes 102 and 108 may be modules of the computing device. For ease of understanding, however, the processes 102 and 108 will be described as separate processes of a computing device throughout the following description of FIG. 1, but shall not be read as limiting on the scope of the invention.

In some embodiments, the various processes and data illustrated by FIG. 1 may be processes and data of a computing device (not shown), such as the exemplary computing device illustrated by FIG. 4, which is described in greater detail below. The computing device, except for presenter user interface 102, web cast 104, slides, quizzes, polls, and/or questions 106, conversion module 108, audiovisual units database 110, online course 112, remaining audiovisual units 114, and recorded web cast 116, may be any single- or multi-processor computing device known in the art, such as a personal computer (PC), a workstation, a server, a router, a mainframe, a personal digital assistant (PDA), an entertainment center, a set-top box, or a mobile device. In some embodiments, the computing device may additionally comprise one or more networking interfaces (not shown) connecting the computing device to a networking fabric (not shown). The networking interfaces may be of any sort known in the art, such as Ethernet, Bluetooth, WiFi (802.11), WiMax, GPRS, or 3G interfaces, providing connectivity to a wired or wireless networking fabric.

In another embodiment, the processes and data illustrated by FIG. 1 may instead be a series of distributed processes of a plurality of computing devices connected by a networking fabric. For ease of understanding, however, reference to one computing device possessing each of the data and processes depicted in FIG. 1 will be made throughout the following description.

In various embodiments, the computing device described above may be connected to a networking fabric (not shown) which, in some embodiments, may provide access for the computing device to the Internet, a private wide area network (WAN) and/or a private local area network (LAN), and may provide access to the computing device for remote users connected to one or more of those networks. Further, the connections between the various computing devices of the networking fabric may be of any sort known in the art, such as transmission control protocol/Internet protocol (TCP/IP) connections or asynchronous transfer mode (ATM) virtual connections.

As is shown and described earlier, for the embodiments, the computing device may include a presenter user interface 102 that is coupled to the conversion module 108. The presenter user interface 102 may facilitate a presenter of a web cast/audiovisual stream 104 in creating the web cast 104. Also, the presenter user interface 102 may be a graphical user interface, a command line interface, or any other type of user interface known in the art. For purposes of illustration, presenter user interface 102 will be described as a graphical user interface. Such a graphical user interface may be presented as a web page accessed through a browser of the computing device or may comprise part of an application process that may also include the conversion module 108. In one embodiment, the presenter user interface 102 is received as a web page from a remote server, where the remote server has the conversion process 108. To facilitate the presenter in creating the web cast 104, the presenter user interface 102 may include a plurality of windows and/or views, as well as a plurality of buttons. For example, the presenter user interface 102 may include a slide window showing a current presentation slide and one or more buttons facilitating transitions between the slides, such as previous and next buttons. In some embodiments, the slides may have been previously created using another application, such as Microsoft PowerPoint, while in other embodiments the presenter user interface 102 may include slide creation and manipulation facilities. The presenter user interface 102 may also include a window or windows for quizzes, polls, and/or questions 106 to facilitate the presenter in receiving answers from the remote users participating in the web cast 104, if the presenter is creating a live web cast. The quiz, poll, and/or question 106 windows may also facilitate a presenter in textually creating the quiz, poll, and/or question as a graphical page which includes the quiz, poll, and/or question as a textual representation. Further, the presenter may also create a page including a question or quiz answer or poll result to be graphically displayed as text to a remote user viewing web cast 104. In addition, the presenter user interface 102 may include a window showing the presenter a video feed of the presentation being captured as it is given. In some embodiments, the presenter user interface 102 also includes a "publish" button which the presenter may select at the end of the presentation to initiate the conversion module 108 and convert the web cast 104 to an online course 112. The presenter user interface 102 may then prompt the presenter for a number of pieces of information before beginning the conversion process, such as textual answers to quizzes, polls, and/or questions 106, time periods to allow an online course 112 user in answering a quiz, poll, and/or question, a threshold score that a user must achieve to pass the online course 112, etc.

In various embodiments, the presenter user interface 102 may further include an editing interface to allow the presenter to edit a completed or in-progress web cast 104. In some embodiments, this edit interface may be automatically provided to a presenter who has clicked the above described "publish" button. Such an interface may allow the presenter to review the entire web cast 104, removing portions that the presenter does not wish to include in future broadcasts of the web cast 104 or in the online course 112, and may also allow the presenter to reallocate a portion of the web cast 104 to a more appropriate time within the web cast 104.

As illustrated, web cast/audiovisual stream 104 may be any stream of audio and/or visual content comprising at least a quiz, poll, or question. The web cast 104 may be captured and streamed live to remote users at a specific time for a specific duration or may be recorded and viewed at a later time, either initiated by a remote user or by a web cast 104 providing server. The recorded web cast 104 may also have a specific duration and may be streamed to the remote user, preventing control, playback, and/or pausing by the remote user. In other embodiments, a remote user may have a measure of control over the viewing of a recorded web cast 104, allowing the user to pause and/or playback all or portions of the web cast 104. If the web cast 104 is live, remote users may, in some embodiments, actively participate in the web cast 104 by providing answers to quizzes, polls, and/or questions 106, and sending those answers to the presenter, who may then tally (or receive a tally of) the answers of the remote users and may share the tally with the users. If web cast 104 is recorded, such interactivity between the presenter and remote users may not be a feature of the recorded web cast 104.

Further, the remote user may receive the web cast 104 in any manner known in the art as an audio and/or visual stream and may receive the slides of the presentation as a separate window, may simply view them as a part of the video stream, or may receive the slides as an email attachment of an email sent to the remote users who are to view the web cast 104. The quizzes, polls, and/or questions 106 may likewise simply be presented as part of the audio and/or visual streams, and/or may be presented in a separate window as textual representations. If presented as textual representations, the quizzes, polls, and/or questions 106 may be part of a web page form providing the remote user with a selection of answers which may transmit the answer(s) selected by the remote user to the presenter, if the web cast 104 is live. The presenter may then provide the answer to the quizzes, polls, and/or questions 106 as part of the audio and/or visual streams, or may provide the answer in a window (for instance, the same window providing the quizzes, polls, and/or questions 106) as further textual representations in response to the remote user's answer selection.

In various embodiments, conversion module 108 is equipped to convert the web cast 104 into an online course 112 and/or to convert an online course 112 into a recorded web cast 116. The conversion module 108 may be coupled to the presenter user interface 102 and may detect events in the web cast 104, such as the presenter transitioning between slides, beginning a poll, ending a poll, beginning the web cast 104, ending the web cast 104, etc. simultaneously with the capturing of the web cast 104. The conversion module 108 may also capture the web cast 104 as it is broadcast to remote users and, upon detecting an event, may store a portion of the web cast 104 captured between the newly detected event and a previous event (or the start of web cast 104) as an audiovisual unit in a database 110. Thus, the web cast 104 may be stored as a set of audiovisual units, determined based at least on one or more determined events. If the web cast 104 is accompanied by a set of slides, the corresponding slide to an audiovisual unit, if any, may also be stored in database 110. In addition to determining and storing the audiovisual units and slides, the conversion module 108 may determine and store additional information describing each of the audiovisual units, such as a duration of each unit, a start time of each unit relative to the web cast 104 (e.g., a unit may start at 43:08 in a total web cast 104 duration of 1:42:45), an event associated with each unit, such as the event immediately preceding the start of the unit, a type, such as "slide", "quiz question", or "quiz answer" associated with each unit, and/or a name for each unit. The type of an audiovisual unit may be determined, based upon presenter interactions with the presenter user interface 102. For example, if the presenter transitions to a new slide, the conversion module 108 may associate the unit beginning at that slide transition with the type "slide." The name of a unit may be extracted from the text of a slide or from a quiz, poll, or question (if textual), or may be extracted from an audio stream by a module capable of recognizing spoken words and outputting corresponding text. Accordingly, the audiovisual units and related data may be stored in the database 110.

Upon completion of the web cast 104, the presenter user interface 102, in some embodiments, may allow the presenter to edit the web cast 104, as discussed above. This may comprise the presenter accessing the units stored in database 110, deleting all or a portion of a unit or units, and changing the position of the unit within the stream of the web cast 104. Any of these changes may result in concomitant changes by the conversion module 108 to the corresponding units in database 110, such as the creation of new units (for example, when the middle portion of a unit is deleted, two new units may be created in its place), and/or changes to the data related to a unit (such as its start time).

In various embodiments, the conversion module 108 may remove all or a portion of one or more of the audiovisual units. The units removed may be units with data types corresponding to one of "quiz," "poll," or "question," where the quiz, poll, or question time period is filled with dead air or conversation regarded as unimportant. In such embodiments, the quiz, poll, or question may have been provided through a textual representation. The remote users may thus have had a period of time during a live web cast to answer the textually delivered quiz, poll, or question, during which the question was either reproduced by the audio or visual feeds, or was provided along with a period of silence or some other conversation, such as a review or summary of materials, that may be unimportant. Thus, the textual representation may be retained, and the visual and audio feeds may be removed. Removal of an audiovisual unit may comprise deleting the unit from database 110 or may simply comprise setting a flag variable associated with the unit to indicate that the unit is not to be input to online course 112.

In some embodiments, the conversion module 108 may optimize one or more of the audiovisual units by adjusting its start and/or end times. An event may not always mesh nicely with the audio and/or video content. For instance, a presenter may transition to a next slide before finishing his or her thoughts on the current slide. Such optimizations can be achieved in any manner known in the art. The conversion module 108 may, for example, present an editor user with an interface allowing the editor user to adjust the times associated with a unit or may utilize an application capable of interpreting auditory signals, which may listen for dead air and adjust the start and stop times to correspond to dead air.

In yet other embodiments, not shown here, the conversion module may not be coupled to a presenter user interface 102. This may be the case if the audiovisual stream has been previously recorded. In such embodiments, conversion module 108 may, instead, be coupled to other application modules known in the art capable of analyzing audiovisual content and determining the above described events.

As is shown, the conversion module 108 may be coupled to a database 110. The database 110 may be on the same computing device or may reside on a remotely accessible database server (not shown). Database 110 may be a relational database, any other sort of database known in the art, or even simply a de-normalized file capable of storing data. If a relational database is employed, database 110 may include a set of tables with a table allocated to each audiovisual unit and its related data. Thus, an individual table may include an audiovisual unit, an associated slide, duration, a start time, a type, etc. Numerous other structurings of the above described audiovisual units and related data are also possible and may be used to store such data in database 110.

In various embodiments, the remaining audiovisual units 114 that have not been removed by conversion module 108 may be input to an online course 112. The online course 112 may comprise a graphical user interface shell capable of being customized through audiovisual unit 114 inputs. The online course 112 may, for example, include a table of contents window listing the units and associated times, allowing a user to experience the units one at a time, out of order, or repeatedly. Upon selection of a unit 114, the video contents of the unit 114 may be displayed in one window and the slide or quiz/poll/question may be displayed in another window. The online course 112 graphic user interface may be provided by another module of the computing device (not shown), by the conversion module 108, or by a remote computing device to which the remaining audiovisual units 114 are sent. In other embodiments, however, no graphical user interface is provided, and the remaining audiovisual units 114 may comprise the entire online course 112 and may simply be viewed as a set of audiovisual recordings by any media player known in the art, such as the Windows Media Player of Microsoft or the QuickTime Player of Apple.

In some embodiments, the audiovisual units must be viewed in a certain order and a provided quiz, poll, or question must be correctly answered to advance to a next audiovisual unit. In presenting such a quiz, poll, or question, the online course 112 may make use of the textual representations used in web cast 104 to convey questions and answers to the remote users. The online course 112 user may be presented with a quiz, poll, or question and may either be given a facility for entering an answer or may be provided with multiple answers to select from. The user may then enter or select an answer and the online course 112 may compare the answer to the answer provided in the textually represented answer provided in the web cast 104.

The ability to test users of online courses may be useful for meeting professional certification or continued learning requirements. Numerous professions, such as law and accounting, require various certifications and continued learning. An online course 112 may allow a web cast 104, designed for such a purpose, to reach a broader audience and make available to persons in those professions a greater variety of continued learning resources.

In some embodiments, conversion module 108 may also receive an online course 112 as input. Such a course 112 may be retrieved by the module 108 or received from a separate process (not shown). The online course 112 may comprise the audiovisual units 114 and may additionally include related data (not shown), such as textual representations of quizzes, polls, and/or questions, and slides corresponding to audiovisual units 114. The conversion module 108 may extract the units 114 and related data from online course 112 or may simply receive these portions of course 112 as input. The process of extracting units 114 and related data may be the reverse of the process inputting the units 114 and data into the generic shell of course 112. Once extracted/received, the conversion module 108 may store the units 114 and data in database 110 (if the units 114 and data are not already stored) or may first convert the units 114 and data to recorded web cast 116, and may store recorded web cast 116 in database 110.

To convert the audiovisual units 114 and related data to recorded web cast 116, the conversion module 108 may determine a time period for each textually represented quiz, poll, or question of the related data, during which the quiz, poll, or question is to be displayed to web cast 116 viewers. The time period may be set by default at a pre-determined span. In alternate embodiments, where the online course 112 received as input had been previously converted from a web cast 104, conversion module 108 may determine the duration of removed portions of web cast 104 corresponding to the textually represented quizzes, polls, and/or questions and may set the time period for each, based on the durations of the removed portions.

Upon determining the time period, the conversion module 108 may sequence the units 114 and related data to create recorded web cast 116. In some embodiments, the sequence may be deduced from the order of the units 114 in online course 112 and from the associations of the data, including the slides, quizzes, polls, and/or questions, to the units 114. For example, a resultant sequence may be a first audiovisual unit 114, followed by a second unit 114 and a slide associated with that unit, the slide and second unit 114 to be concurrently displayed, the second unit 114 followed by a textually presented quiz, and the quiz followed by a third unit 114. Such a sequence, upon being determined by the conversion module, may be used to create and render recorded web cast 116 as a stream of audiovisual content.

In some embodiments, recorded web cast 116 may be like web cast 104, described above. Web cast 116 may differ from web cast 104 in that dead air and irrelevant conversation may have previously been removed, since web cast 116 may have been converted from online course 112 and online course 112, in the process of having been converted from web cast 104, may have had dead air and irrelevant conversation removed. In place of the dead air/irrelevant conversation, web cast 116 may display textual representations of quizzes, polls, and/or questions for the determined time periods described above. Like web cast 104, web cast 116 may display slides concurrently with audiovisual contents.

Figure 2:
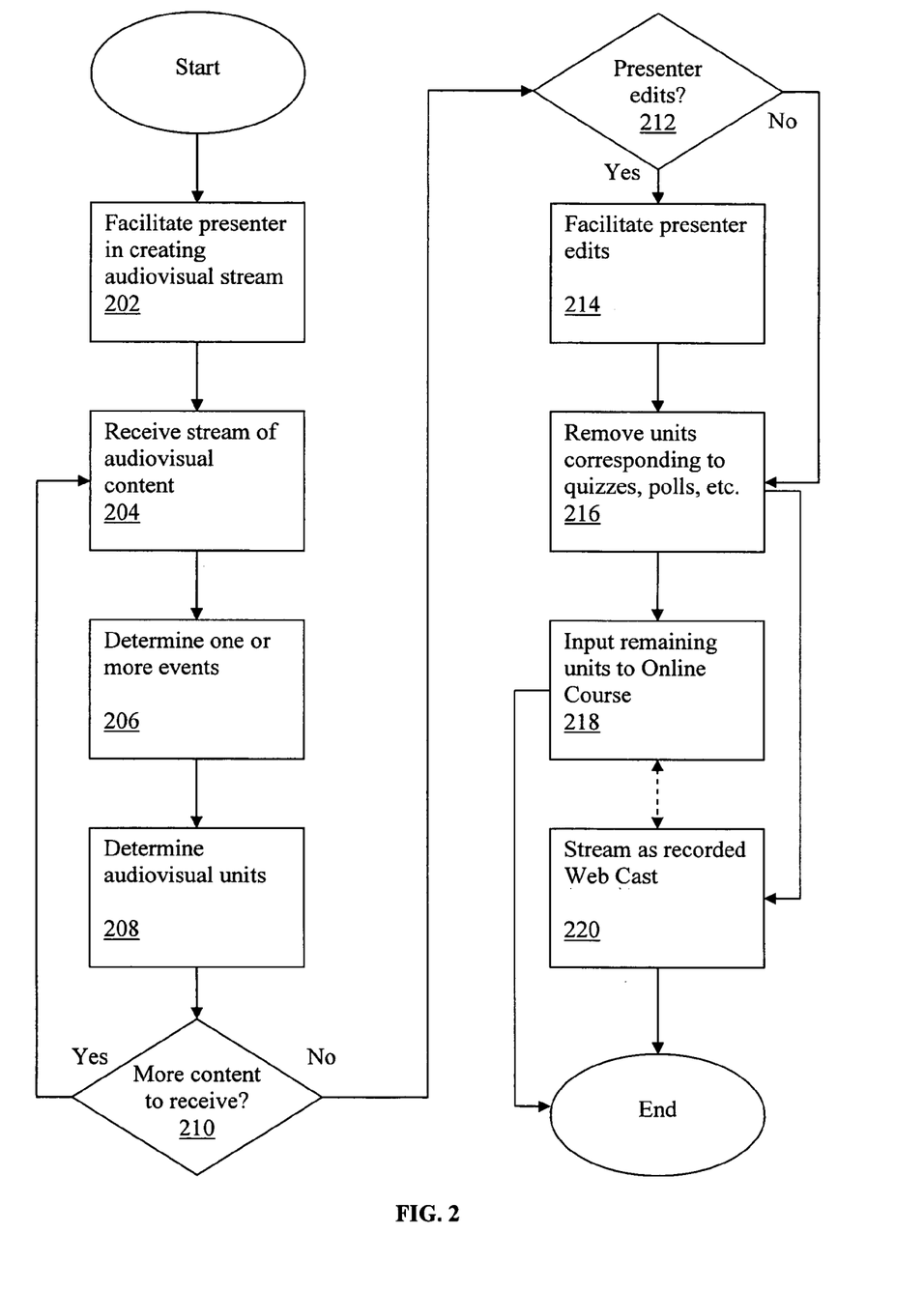
FIG. 2 illustrates a flow chart view of selected operations of the methods of various embodiments of the present invention, converting a web cast to an online course.

FIG. 2 illustrates a flow chart view of selected operations of the methods of various embodiments of the present invention, converting a web cast to an online course. As illustrated, for the embodiments, a computing device may facilitate a user in creating a web cast, receive the created web cast, determine one or more events in the web cast, and determine a set of audiovisual units from the web cast corresponding to the determined events, blocks 202-208. As discussed earlier, in various embodiments, the computing device may include a presenter user interface to facilitate a presenter in creating a web cast, block 202. The web cast may include a number of slides, quizzes, polls, and/or questions in addition to audio and video contents. The interface may further include a number of views showing slides, quizzes, polls, and questions that may be displayed to remote users, and a number of buttons facilitating the presenter in transitioning to a different slide, or in initiating or ending a quiz, poll, or question. Simultaneously or subsequent to the creation of the web cast, the computing device may receive/capture the web cast, may determine one or more events in the web cast, and may determine one or more audiovisual units, blocks 204-208. If the presenter is creating the web cast on the same device that is performing the receiving and determining operations, the receipt may simply be receipt of the web cast stream from the presenter user interface process, block 204. In other embodiments, the presenter user interface may be located on a remote computing device and the computing device performing the receiving and determining operations may receive the web cast from that remote device, block 204. Simultaneously with receiving or retrieving the captured the web cast, the computing device may determine one or more events in the web cast, block 206. The events may comprise one or more of clicks transitioning between slides and beginning and ending polls. The computing device may include or be coupled to the presenter user interface and may detect these events as they occur. Upon determining each event, the computing device may determine an audiovisual unit corresponding to the determined event, block 208, and may store the audiovisual unit and related data, such as corresponding slide(s), duration of the unit, etc. in a database. The computing device may perform these determining and storing operations for each newly detected event. Accordingly, the operations of receiving/retrieving the web cast, determining events, and determining audiovisual units may be repeated, block 210, until the entire web cast has been processed.

As illustrated, the computing device including the presenter user interface may then determine if there are any presenter edits to be made, block 212 and, if there are, may facilitate a presenter in editing the web cast, block 214. The presenter user interface may access the database where the audiovisual units are stored and may facilitate the presenter in deleting a portion of the web cast or in moving a time slice/portion of the web cast to a different point within the web cast, among other operations.

In some embodiments, the computing device may remove one or more of the audiovisual units and may either input the remaining units to an online course, stream the units as a recorded web cast, or do both, blocks 216-220. Upon completion of the web cast, the computing device may remove portions of audiovisual units corresponding to quizzes, polls, and/or questions, block 216. The portions removed may comprise periods of silence or voice deemed irrelevant and if the quizzes, polls, and/or questions have been textually presented to remote users as well, the video and audio alone may be removed, allowing future recipients of the audiovisual units to view the quizzes, polls, and/or questions in textual form. The removed portions also need not be deleted from the database, but may simply be marked with an indicator as units not to be used in an online course or future recorded web cast. After removing the portions of units, the computing device may either input the remaining units to an online course, stream the units as a recorded web cast, or do both, blocks 218-220. The remaining units may comprise content that can be used to customize a graphical online course shell by being input to that shell, block 218. The units in the context of the online course may then be viewed in any order, paused, reviewed, etc. In some embodiments, however, the online course may be used for professional education requirements and certifications and the online course user may be required to complete the units in a certain order and/or pass a quiz at the end of one unit before beginning another. In addition, the remaining units may be combined into one stream of audiovisual content and streamed to a remote user as a recorded web cast, block 220, differing from the above described web cast at least in the removed portions of audiovisual units. Selected operations for generating the recorded web cast are discussed below in reference to FIG. 3.

Figure 3:
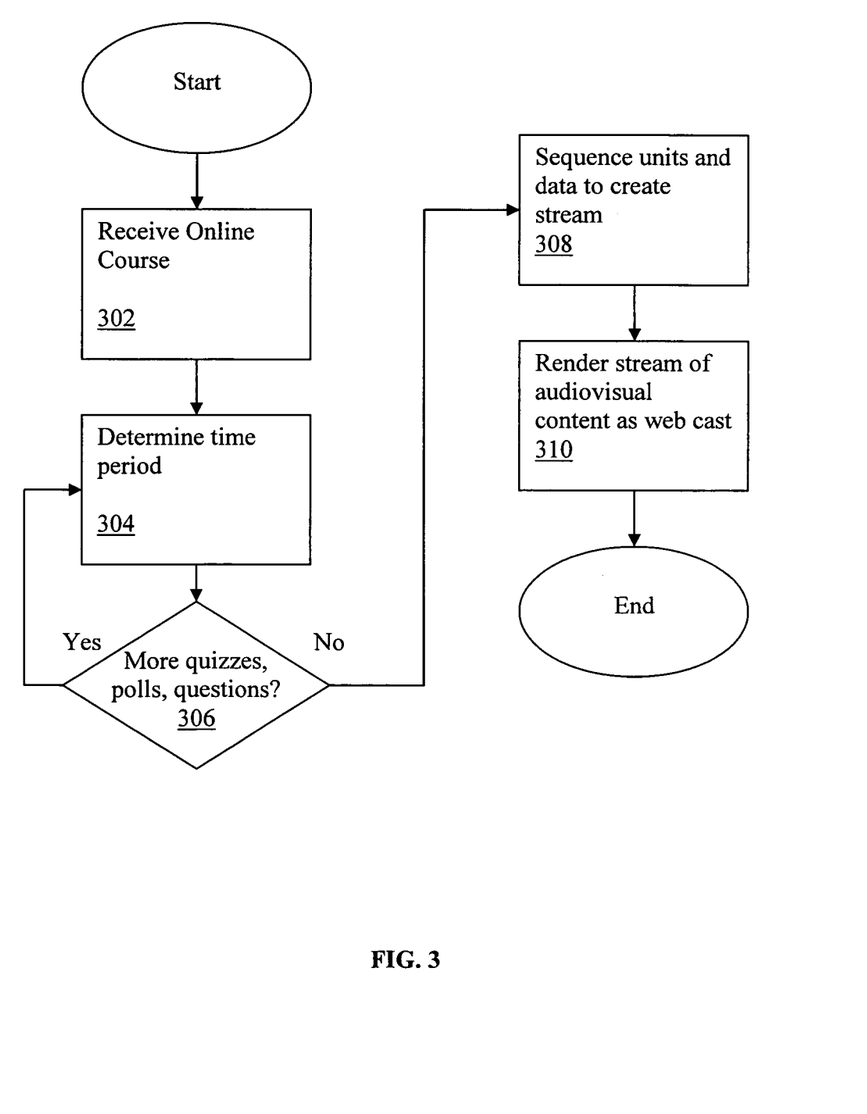
FIG. 3 illustrates a flow chart view of selected operations of the methods of various embodiments of the present invention, converting an online course to a web cast.

FIG. 3 illustrates a flow chart view of selected operations of the methods of various embodiments of the present invention, converting an online course to a web cast. As illustrated, for the embodiments, a computing device may receive an online course comprised of audiovisual units and related data as input and may determine time periods for textually represented quizzes, polls, and/or questions of the related data, blocks 302-304. The online course may be received/retrieved from another process of the computing device or from another computing device, block 302. Included among the related data of the online course may be one or more quizzes, polls, questions, and/or slides, the slides corresponding to ones of the audiovisual units. Upon receiving/retrieving the units and data of the online course, the computing device may determine a time period for each of the textually represented quizzes, polls, and/or questions, block 304. In some embodiments, each time period may correspond to a predetermined duration while, in other embodiments, the durations may vary based on the quiz, poll, or question. After determining a time period, the computing device may then determine whether there are more quizzes, polls, and/or questions of the related data, block 306. If so, the computing device may repeat the operations of blocks 304-306.

In some embodiments, the computing device may further sequence the units and related data to create a stream of audiovisual content and render the stream as a recorded web cast, blocks 308-310. Upon determining the time periods, the computing device may determine a sequence for the units and corresponding slides (if any corresponding slides) and for the textually represented quizzes, polls, and/or questions, block 308. The sequence may be derived from the ordering of the units and data within the online course. Upon determining the sequence, the units and data may be used to create a stream of audiovisual content that may be rendered as a web cast to viewers, block 310. The web cast may display units and slides simultaneously, interspersing the units with textually represented quizzes, polls, and/or questions.

Figure 4:
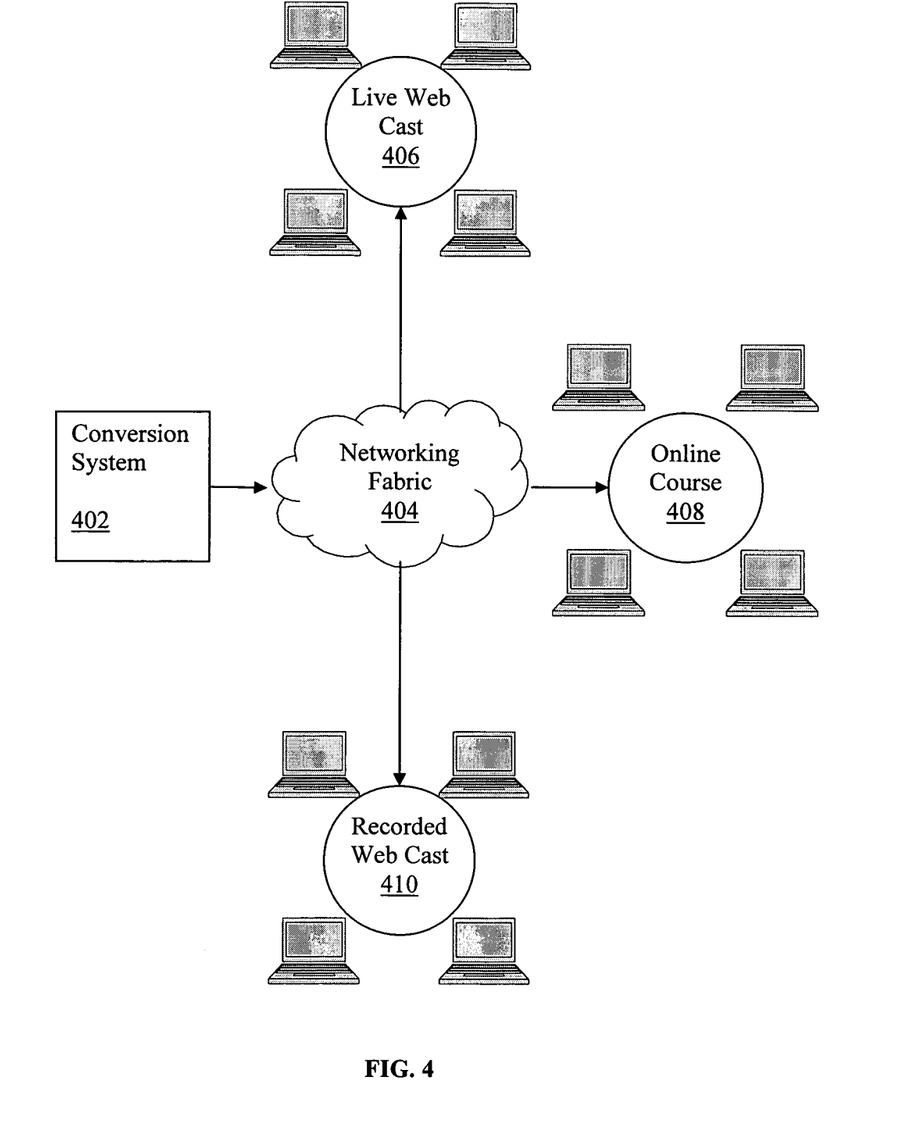
FIG. 4 illustrates a plurality of groups of remote users consuming audiovisual contents, including web casts and an online course, provided by a system of the present invention, in accordance with various embodiments.

FIG. 4 illustrates a plurality of groups of remote users consuming audiovisual content, including web casts and an online course, provided by a system of the present invention, in accordance with various embodiments. As illustrated, a conversion system 402 performing the operations discussed above in reference to FIG. 1 may provide a live web cast 406, online course 408, and a previously recorded web cast 410 to pluralities of remote users over a networking fabric 404. The networking fabric may be of any of the sorts described above in reference to FIG. 1. Additionally, further description of live web cast 406 may be found above in reference to web cast 104, further description of online course 408 may be found above in reference to online course 112, and further description of previously recorded web cast 410 may be found above in reference to recorded web cast 116.

Figure 5:
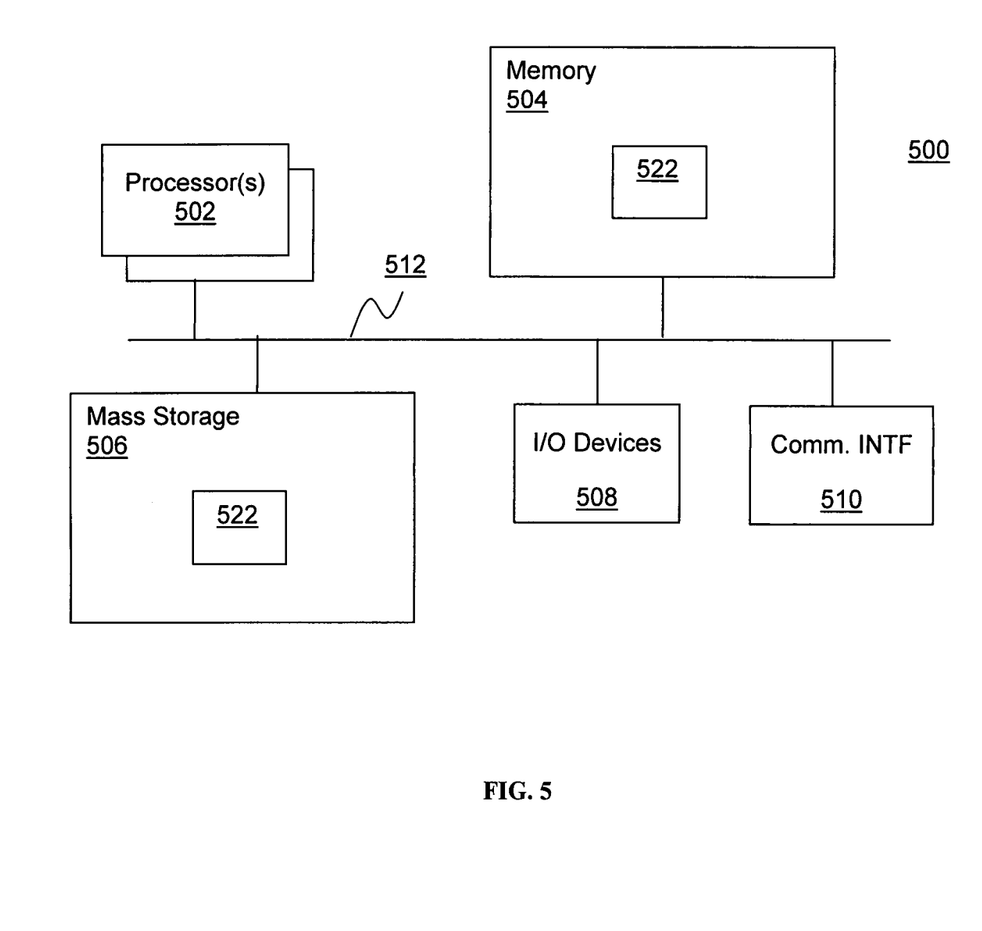
FIG. 5 is a block diagram illustrating an example computing device suitable for use to practice the present invention, in accordance with various embodiments.

FIG. 5 is a block diagram illustrating an example computing device suitable for use to practice the present invention, in accordance with various embodiments. As shown, computing system/device 500 includes one or more processors 502 and system memory 504. Additionally, computing system/device 500 includes mass storage devices 506 (such as diskette, hard drive, CDROM and so forth), input/output devices 508 (such as keyboard, cursor control and so forth) and communication interfaces 510 (such as network interface cards, modems and so forth). The elements are coupled to each other via system bus 512, which represents one or more buses. In the case of multiple buses, they are bridged by one or more bus bridges (not shown).

Each of these elements performs its conventional functions known in the art. In particular, system memory 504 and mass storage 506 may be employed to store a working copy and a permanent copy of the programming instructions implementing selected ones or all of the various components of embodiments of the present invention, such as the processes illustrated by FIG. 1, herein collectively denoted as 522. The various components may be implemented as assembler instructions supported by processor(s) 502 or high level languages, such as C, that can be compiled into such instructions.

The permanent copy of the programming instructions may be placed into permanent storage 506 in the factory or in the field through, for example, a distribution medium (not shown) or through communication interface 510 (from a distribution server (not shown)).

The constitution of these elements 502-512 is known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the present invention. Those skilled in the art will readily appreciate that the present invention may be implemented in a very wide variety of embodiments or extended there from. This application is intended to cover any adaptations or variations of the embodiments discussed herein. Therefore, it is manifestly intended that this invention be limited only by the claims and the equivalents thereof.

What is claimed is:

1. A method comprising:
   receiving, by a computing device, a stream of audiovisual content;

determining, by the computing device, one or more events in the stream of audiovisual content while receiving said stream;

determining, by the computing device, based at least partially on said one or more events, a set of audiovisual units from the stream of audiovisual content;

determining, that one audiovisual unit of the set of audiovisual units includes a quiz, poll, or question;

in response to determining that one audiovisual unit of the set of audiovisual units includes a quiz, poll, or question, removing from the determined set of audiovisual units, by the computing device, audio and video feeds of the one audiovisual unit including the quiz, poll, or question while retaining a textual representation of the quiz, poll, or question; and rendering, by the computing device, the set of audiovisual units as at least a part of an online course, including inputting the set of audiovisual units to a graphic user interface shell, wherein the online course prevents a user from progressing from a first audiovisual unit to a second audiovisual unit the user has passed the quiz of the one audiovisual unit.

2. The method of claim 1, wherein the stream of audiovisual content comprises a live web cast and further includes a plurality of slides.

3. The method of claim 2, wherein the one or more determined events include at least one of a slide transition, a start of a time period for a poll, and an end of the time period for the poll and each of the audiovisual units corresponds to a time period during which a slide of the plurality of slides is displayed or a time period during which a poll is given.

4. The method of claim 2, wherein viewers of the live webcast participate in creating the textual representation by providing answers to a presenter that are subsequently used by the presenter to create the textual representation.

5. The method of claim 1, further comprising facilitating a presenter in creating the stream of audiovisual content through a user interface.

6. The method of claim 1, wherein the online course is used to certify a user or meet professional education or certification requirements.

7. The method of claim 1, wherein the removed audio feed corresponds to a period of dead air.

8. The method of claim 1, wherein the removing comprises deleting the audio and video feeds of the at least one audiovisual unit or storing the audio and visual feeds of the at least one audiovisual unit along with a flag which indicates that the audio and video feeds are not to be included in an online course.

9. The method of claim 1, wherein the textual representation of the quiz, poll, or question is included in the at least one audio visual unit or is included in a web page delivered during a live webcast concurrently with the at least one audiovisual unit.

10. An apparatus comprising:
a processor; and
a computing engine operated by the processor and configured to:
receive a stream of audiovisual content,
determine one or more events in the stream of audiovisual content while receiving said stream,
determine, based at least partially on said one or more events, a set of audiovisual units from the stream of audiovisual content,
determine that one audiovisual unit of the set of audiovisual units includes a quiz, poll, or question;

in response to determining that one audiovisual unit of the set of audiovisual units includes a quiz, poll, or question, remove from the determined set of audiovisual units audio and video feeds of the one audiovisual unit including the quiz, poll, or question while retaining a textual representation of the quiz, poll, or question; and render the set of audiovisual unit as at least a part of an online course, including inputting the set of audiovisual unit to a graphic user interface shell, wherein the online course prevents a user from progressing from a first audiovisual unit to a second audiovisual unit until the user has passed the quiz of the one audiovisual unit.

11. The apparatus of claim 10, wherein the stream of audiovisual content comprises a live web cast and further includes a plurality of slides.

12. The apparatus of claim 10, wherein the computing engine is further configured to facilitate a presenter in creating the stream of audiovisual content through a user interface.

13. The apparatus of claim 10, wherein the removing comprises deleting the audio and video feeds of the at least one audiovisual unit or storing the audio and visual feeds of the at least one audiovisual unit along with a flag which indicates that the audio and video feeds are not to be included in an online course.

14. An article of manufacture comprising:
a non-transitory storage medium; and
a plurality of programming instructions configured to program an apparatus to:
receive a stream of audiovisual content, the audiovisual content including at least one quiz, poll, or question,
determine one or more events in the stream of audiovisual content while receiving said stream,
determine a set of audiovisual units from the stream of audiovisual content, the set of audiovisual units corresponding at least in part to the determined one or more events, wherein at least one audiovisual unit of the set of audiovisual units includes audio and video feeds and an associated textual representation of the at least one quiz, poll, or question, and
remove from the determined set of audiovisual units at least the audio and video feeds of the at least one audiovisual unit while retaining the associated textual representation of the at least one quiz, poll, or question, wherein the removing comprises storing the audio and visual feeds of the at least one audiovisual unit along with a flag which indicates that the audio and video feeds are not to be included in an online course.

15. The article of claim 14, wherein the stream of audiovisual content comprises a live web cast and further includes a plurality of slides.

16. The article of claim 14, wherein the programming instructions are further configured to facilitate a presenter in creating the stream of audiovisual content through a user interface.

17. The article of claim 14, wherein the programming instructions are further configured to render the audiovisual units as at least a part of an online course, including inputting the audiovisual units to a graphic user interface shell.

18. A method comprising:
retrieving from an online course, by a computing device, a set of audiovisual units and related data, the set of audiovisual units including audio and video feeds and the related data including at least one textual representation of a quiz, poll, or question, the set of audiovisual units and the related data being associated with a previous live webcast;

determining, by the computing device, a time period for the at least one textual representation of the quiz, poll, or question, the time period being determined based on a previous duration of a display of the at least one textual representation in the live webcast;

sequencing the set of audiovisual units and the at least one textual representation of the quiz, poll, or question based on an order of the audiovisual units and the related data within the online course to create a rebroadcast of the live webcast; and at a designated time, streaming the set of audio visual units and the related data in the rebroadcast of the live webcast, the rebroadcast including a display of the at least one textual representation of the quiz, poll, or question lasting the determined time period.

19. The method of claim 18, further comprising sequencing the set of audiovisual units and the at least one textual representation of the quiz, poll, or question with one or more slides of the related data corresponding to ones of the set of audiovisual units, the rebroadcast displaying one of the slides and its corresponding audiovisual unit simultaneously.

20. The method of claim 18, wherein the rebroadcast is used to certify a user or meet professional education or certification requirements.

21. The method of claim 18, wherein playback controls of recipients of the rebroadcast are inactivated during the rebroadcast.

* * * * *